(12) United States Patent
Gordon et al.

(10) Patent No.: US 10,040,552 B2
(45) Date of Patent: Aug. 7, 2018

(54) ALERT SYSTEM FOR AN UNMANNED AERIAL VEHICLE

(71) Applicant: INTERNATIONAL BUSINESS MACHINES CORPORATION, Armonk, NY (US)

(72) Inventors: Michael S. Gordon, Yorktown Heights, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/148,628

(22) Filed: May 6, 2016

(65) Prior Publication Data

US 2017/0320569 A1      Nov. 9, 2017

(51) Int. Cl.
*B64C 39/02* (2006.01)
*G06Q 10/08* (2012.01)
(Continued)

(52) U.S. Cl.
CPC ........ *B64C 39/024* (2013.01); *B60L 11/1822* (2013.01); *B60L 11/1824* (2013.01); *B64D 9/003* (2013.01); *B64D 47/06* (2013.01); *B64D 47/08* (2013.01); *G05D 1/101* (2013.01); *G06Q 10/0832* (2013.01); *G06Q 10/0833* (2013.01);
(Continued)

(58) Field of Classification Search
CPC ............. B64C 39/024; B64C 2201/128; B60L 11/1822; B60L 11/1824; B64D 9/003; B64D 47/06; B64D 47/08; G05D 1/101; G06Q 10/0832; G06Q 10/0833; H04L 67/12
See application file for complete search history.

(56) References Cited

U.S. PATENT DOCUMENTS 8,893,086 B2 * 11/2014 Bassin .................. G06Q 10/06
717/124
9,044,543 B2    6/2015 Levien et al.
(Continued)

FOREIGN PATENT DOCUMENTS

EP            2664539 A1    11/2013

OTHER PUBLICATIONS

Anonymous, "Method and System for Enabling Drones to Maintain Balance during Multiple Package Delivery," IP.com, Dec. 2015. (pp. 1-5).
(Continued)

*Primary Examiner* — Rodney A Butler
(74) *Attorney, Agent, or Firm* — Tutunjian & Bitetto, P.C.; Yeen C. Tham

(57) ABSTRACT

An unmanned aerial vehicle for aerial transportation of delivery items. The unmanned aerial vehicle includes an attachment device to fasten and unfasten one or more delivery items to the unmanned aerial vehicle, a motor to aerially transport the one or more delivery items along a delivery route, a sensor mounted on the unmanned aerial vehicle to detect at least one environmental variable during the delivery route, and an alert system to generate a status associated with the unmanned aerial vehicle along the delivery route to an observer when the environmental variable exceeds a predetermined threshold.

20 Claims, 9 Drawing Sheets

(51) Int. Cl.
- *B64D 9/00* (2006.01)
- *B60L 11/18* (2006.01)
- *G05D 1/10* (2006.01)
- *H04L 29/08* (2006.01)
- *B64D 47/08* (2006.01)
- *B64D 47/06* (2006.01)

(52) U.S. Cl.
CPC ........ *H04L 67/12* (2013.01); *B64C 2201/128* (2013.01)

(56) References Cited

U.S. PATENT DOCUMENTS

| | | | |
|---|---|---|---|
| 9,542,849 B1* | 1/2017 | Bertram | G08G 5/003 |
| 9,650,136 B1* | 5/2017 | Haskin | B64D 1/12 |
| 2009/0268753 A1* | 10/2009 | Lail | H04L 67/2871 |
| | | | 370/466 |
| 2014/0025228 A1 | 1/2014 | Jang et al. | |
| 2014/0025230 A1 | 1/2014 | Levien et al. | |
| 2014/0027131 A1* | 1/2014 | Kawiecki | A62C 3/0242 |
| | | | 169/45 |
| 2015/0063959 A1 | 3/2015 | Saad et al. | |
| 2015/0120094 A1 | 4/2015 | Kimchi et al. | |
| 2016/0101855 A1* | 4/2016 | Stefani | G08G 5/0008 |
| | | | 701/2 |
| 2016/0163204 A1* | 6/2016 | Raptopoulos | G08G 5/0069 |
| | | | 701/3 |
| 2016/0171896 A1* | 6/2016 | Buchmueller | G08G 5/0008 |
| | | | 701/3 |
| 2016/0236778 A1* | 8/2016 | Takayama | B64D 1/12 |
| 2016/0247407 A1* | 8/2016 | Paczan | G08G 5/045 |
| 2016/0257401 A1* | 9/2016 | Buchmueller | B64C 39/024 |
| 2016/0325127 A1* | 11/2016 | Billman | A62C 3/0285 |
| 2017/0286892 A1* | 10/2017 | Studnicka | G06Q 10/083 |

OTHER PUBLICATIONS

Barnawi, WT., Integrated consensus-based frameworks for unmanned vehicle routing and targeting assignment, Dissertation at Univ. of Alabama in Huntsville, Copyright 2015. Abstract Only. (1 Page).

Darwin Aerospace, "The world's first airborne Mexican food delivery system," http://www.darwinaerospace.com/, Copyright 2012. (pp. 1-3). Available at http://www.darwinaerospace.com/burritobomber.

IBM, "Method to Improve the Accuracy of Progress Indicators," IP.com, Sep. 2006. (pp. 1-3).

* cited by examiner

ALERT SYSTEM FOR AN UNMANNED AERIAL VEHICLE

BACKGROUND

Technical Field

The present invention relates generally to an unmanned aerial vehicle and, in particular, to an alert system for an unmanned aerial vehicle.

Description of the Related Art

Physical delivery of consumer goods is the process of transporting goods from a source location, such as a shipping facility or sender, to a predefined destination, such as the consumer's and/or recipient's location. There are a variety of transportation methods to deliver consumer goods, which are often operated by delivery services, including delivery by trucks via roads, trains via railroads, cargo ships via sea, and airplanes via air. However, delivery of such goods may take a substantial amount of time (e.g., several days) to transport the goods due to various factors, including traveling distance, weather conditions, traffic conditions, terrain conditions, etc.

SUMMARY

According to an aspect of the present principles, an unmanned aerial vehicle for aerial transportation of delivery items is provided. The unmanned aerial vehicle may include at least one attachment device to fasten and unfasten one or more delivery items to the unmanned aerial vehicle, at least one motor to aerially transport the one or more delivery items along a delivery route, at least one sensor mounted on the unmanned aerial vehicle to detect at least one environmental variable during the delivery route, and an alert system to generate a status associated with the unmanned aerial vehicle along the delivery route to at least one observer when the least one environmental variable exceeds a predetermined threshold.

According to another aspect of the present principles, a method for aerial transportation of delivery items using an unmanned aerial vehicle is provided. The method may include attaching one or more delivery items to the unmanned aerial vehicle, aerially transporting the one or more delivery items along a delivery route, detecting, using at least one sensor mounted on the unmanned aerial vehicle, at least one environmental variable during the delivery route, and generating a status associated with the unmanned aerial vehicle along the delivery route to at least one observer when the least one environmental variable exceeds a predetermined threshold.

According to another aspect of the present principles, a non-transitory computer readable storage medium for aerial transportation of delivery items using an unmanned aerial vehicle is provided. The non-transitory computer readable storage medium may include a computer readable program for aerial transportation of delivery items using an unmanned aerial vehicle, wherein the computer readable program, when executed on a computer, causes the computer to execute attaching one or more delivery items to the unmanned aerial vehicle, aerially transporting the one or more delivery items along a delivery route, detecting, using at least one sensor mounted on the unmanned aerial vehicle, at least one environmental variable during the delivery route, and generating a status associated with the unmanned aerial vehicle along the delivery route to at least one observer when the least one environmental variable exceeds a predetermined threshold.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
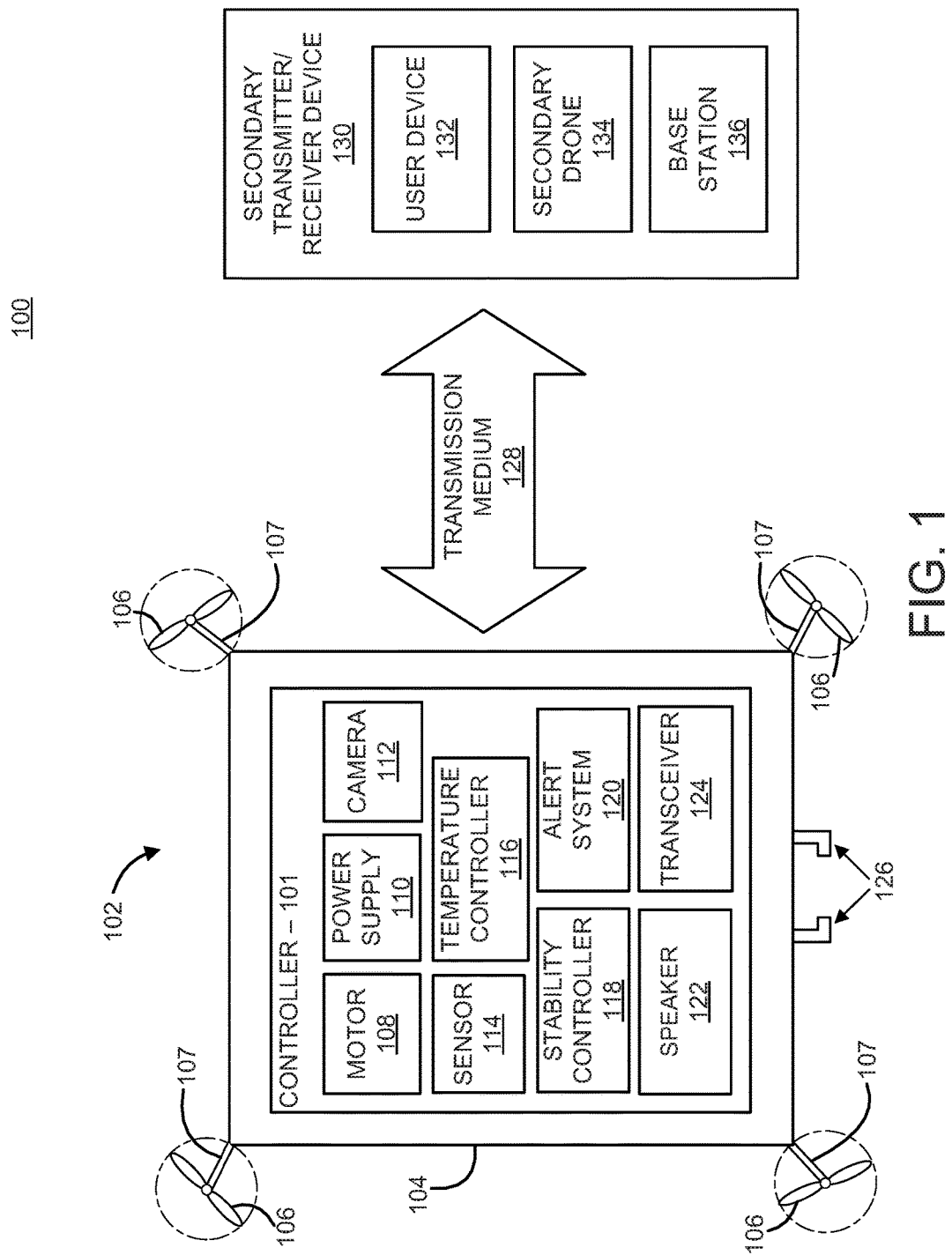
FIG. 1 shows an exemplary system for aerial transportation of delivery items using an unmanned aerial vehicle, in accordance with an embodiment of the present principles.

The present principles are directed to an alert system for an unmanned aerial vehicle. In the embodiment, an alert mechanism may generate an alert, such as a status, associated with the unmanned aerial vehicle during aerial delivery of one or more items to a destination location. In other embodiments, the alert mechanism may indicate an amount of travel time and/or various environmental variables experienced during delivery to, for example, assess a level of risk to the items being delivered. In some embodiments, the present principles provide a system, method and computer program product to indicate progress of at east one task for the unmanned aerial vehicle and display the level of completion of the at least one task via a readily detectable status indicator, such as an illumination device, timer display, and/or a broadcasted electronic signal.

It should be understood that the words "alert," "status" and "progress" are used loosely and are not intended to suggest any limitation as to the scope of use or functionality of embodiments of the present principles described herein. For example, "alert," "status" and/or "progress" may refer to, but are not limited to, a level of task completion of one or more deliveries, an amount of time associated with a delivery, a level of turbulence experienced during a delivery, an indication of temperatures traversed during delivery, a level of gravitational force and/or tilt experienced during delivery, a value associated with the items for delivery, etc. It should also be understood that the word "flight" is used loosely and is not intended to suggest any limitation. For example, "flight" may refer to, but is not limited to, any stage during the delivery of an item, such as when the unmanned aerial vehicle has landed.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for aerial transportation of delivery items using an unmanned aerial vehicle 102 is illustratively depicted. It should be understood by one of ordinary skill in the art that the unmanned aerial vehicle 102 may comprise a drone, a drone-like unit, or a similarly functioning device.

Advancements in unmanned aerial vehicles (UAVs) and/or drones have been implemented for delivery services of such consumer goods. For example, a delivery drone, also known as a parcelcopter, may transport packages, food, medicines, and other goods with delivery times much faster than traditional transportation methods (e.g., minutes). In addition, drones used for delivery services also enable delivery of such goods to remote locations that are difficult to get to by traditional transportation methods due to varying terrain on such delivery routes.

The unmanned aerial vehicle 102 may include a housing unit 104, at least one movement mechanism 106, and a motor 108. The components of the unmanned aerial vehicle 102 may be affixed on the outside of the housing unit 104, or alternatively, may be enclosed within the housing unit 104 of the unmanned aerial vehicle 102.

The at least one movement mechanism 106 may include a single propeller, a plurality of propellers, a propulsion mechanism, or similarly functioning devices to provide aerial movement for the unmanned aerial vehicle 102. In one embodiment, the at least one movement mechanism may be powered by at least one motor 108, such as a gasoline engine, electric motor and/or a power supply 110 to provide movement for the unmanned aerial vehicle 102. The power supply 110 may include a battery, such as a rechargeable battery, and/or solar powered battery sufficient for powering the unmanned aerial vehicle 102 and/or components of the unmanned aerial vehicle 102.

The movement mechanism(s) 106 may be placed at any desired location on the unmanned aerial vehicle 102, such that the placement of the movement mechanism(s) 106 does not interfere with each other or with another component positioned on the unmanned aerial vehicle 102 and/or housing unit 104. In one embodiment, the at least one movement mechanism 106 may be positioned on at least one extension arm 107 such that the at least one extension arm 107 connects the at least one movement mechanism 106 to the housing unit 104.

In some embodiments, the at least one movement mechanism 106 and/or extension arm(s) 107 may be spaced around the unmanned aerial vehicle 102 and/or positioned such that the unmanned aerial vehicle 102 maintains a balanced orientation. A balanced orientation may be a state of equilibrium in which the unmanned aerial vehicle 102 may enable an efficient flight. In further embodiments, the position of the at least one movement mechanism 106 and/or extension arm(s) 107 may be adjusted such that the unmanned aerial vehicle 102 maintains a balanced orientation. For example, the movement mechanism(s) 106 and/or extension arm(s) 107 may pivot and/or hinge from the housing unit 104 of the unmanned aerial vehicle 102 in various directions. In some embodiments, the position of the extension arms 107 may be adjusted and/or repositioned when the unmanned aerial vehicle 102 carries a delivery item (not shown) via attachment device 126 to maintain a balanced orientation.

Figure 5:
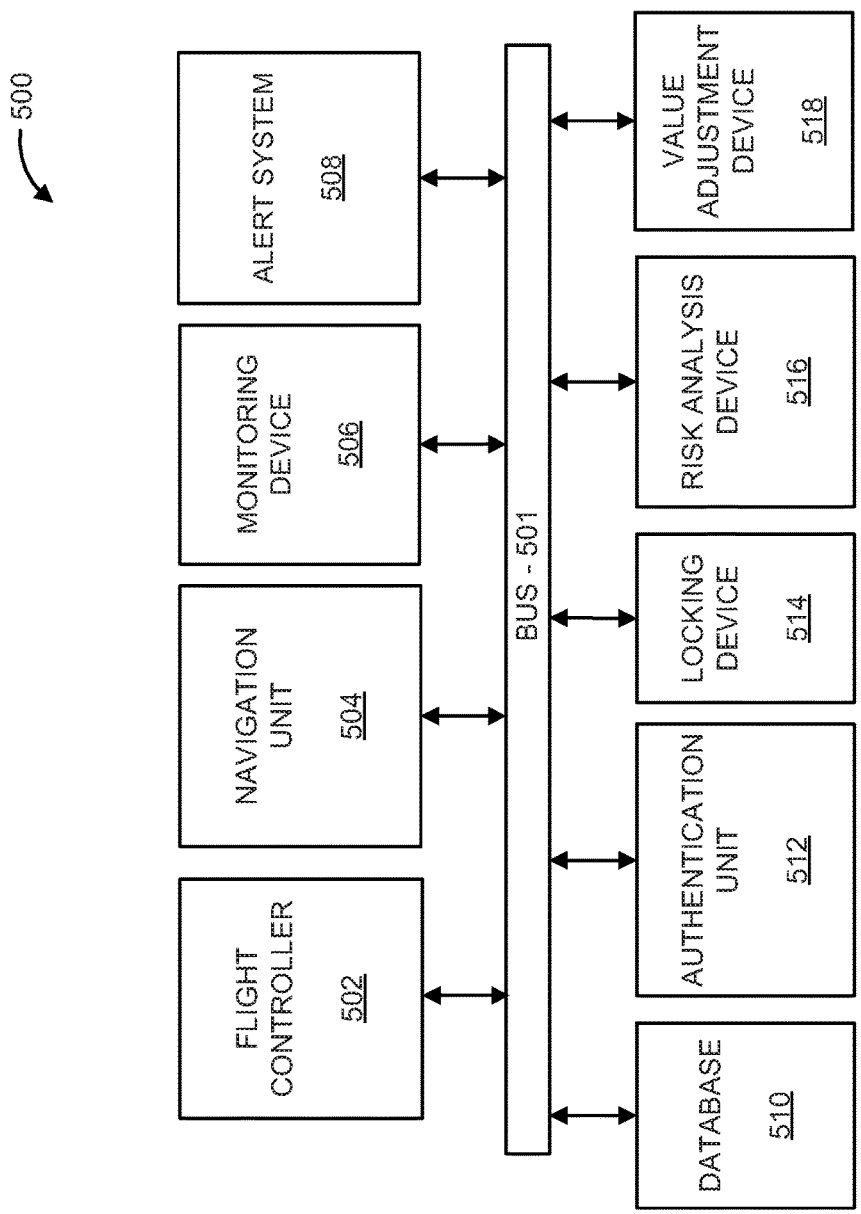
FIG. 5 shows an exemplary system for aerial transportation of delivery items using an unmanned aerial vehicle, in accordance with an embodiment of the present principles.

In one embodiment, the movement mechanism 106 and/or motor 108 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 and/or motor 108 may be controlled by controller 101, such as a flight controller 502, as illustrated in FIG. 5, to move the unmanned aerial vehicle 102 along three perpendicular axes, namely forward/backward movement, up/down movement, and left/right movement. In addition, the controller 101 may control the movement of the unmanned aerial vehicle in 360 degree rotation, tilting forward/backward movement (e.g., pitching), swiveling left/right movement (e.g., yawing), and pivoting side to side movement (e.g., rolling).

In one embodiment, the movement mechanism(s) 106 and/or motor 108 provides movement for the unmanned aerial vehicle 102 to deliver one or more items to a particular destination. For example, the movement mechanisms 106 and/or motor 108 may enable the unmanned aerial vehicle 102 to aerially transport delivery items from a shipping location to a particular delivery destination, such as a consumer's location and/or shipping address. In further embodiments, the movement mechanism 106 and/or motor 108 may provide aerial movement to the unmanned aerial vehicle 102 to base stations, recharging stations, shipment facilities, and/or locations of other unmanned aerial vehicles to, for example, recharge the power supply 110, as will be described in further detail below. In yet a further embodiment, the movement mechanism(s) 106 and/or motor 108 provides movement for the unmanned aerial vehicle 102 to avoid collision between the unmanned aerial vehicle 102 and an object, such as a person, tree, building, and/or other structures.

In some embodiments, the attachment device 126 fastens a delivery item (not shown) to the unmanned aerial vehicle 102. The attachment device 126 may include, but is not limited to, a latch, a hook or claw, a suction device, a magnetic device, or combination thereof, and/or any other device capable of temporarily attaching (e.g., fastening) the delivery item to the unmanned aerial vehicle 102 and releasing (e.g., unfastening) the delivery item upon delivery. In an embodiment, the attachment device 126 may include a retractable wire which may be permanently attached to the housing unit 104 at one end and, at the other end, may include a hook, latch, or further accessory to connect the delivery item to the wire and/or unmanned aerial vehicle 102.

In some embodiments, the attachment device 126 may include a compartment and/or enclosure to store the delivery item on the unmanned aerial vehicle 102 until delivery. The compartment may be integrated with the unmanned aerial vehicle 102 and/or may be attached to the unmanned aerial vehicle 102. In further embodiments, the compartment and/or enclosure may be temperature controlled by one or more sensors 114 and/or a temperature controller 116 to, for example, provide protection to perishable items, such as foods, medicines, life-forms (e.g., plants, animals), etc. In a further embodiment, the attachment device 126 (e.g., compartment) may be thermally insulated. For example, the attachment device 126 may comprise and/or include insulating material within the compartment.

In a further embodiment, the attachment device 126 may include a dampening and/or absorbent material, thermal or acoustical insulation, and/or inflatable air compartments configured to reduce and/or mitigate sound (e.g., noise) and/or vibration generated from, for example, the movement mechanism(s) 106 and/or motor 108 during flight. The dampening material and/or air compartments may further protect fragile items being delivered by the unmanned aerial vehicle 102. The dampening material may be disposed at any location within and/or on the attachment device 126. For example, when the attachment device 126 is a compartment, the dampening material may be placed as a liner within the compartment.

The unmanned aerial vehicle 102 may be configured to engage and/or deploy the attachment device 126. For example, the unmanned aerial vehicle 102 may close a latching device so as to "lock" a delivery item to the unmanned aerial vehicle 102. In addition, the unmanned aerial vehicle 102 may open the latching device so as to release the delivery item upon delivery. In some embodiments, the unmanned aerial vehicle 102 may be configured to deploy the retractable wire to a sufficient height above the ground to enable safe delivery of the delivery item.

The unmanned aerial vehicle 102 may further include a controller 101 configured to control one or more components of the unmanned aerial vehicle 102. For example, the controller 101 may control at least one camera 112, at least one sensor 114, a temperature controller 116, a stability controller 118, an alert system 120, a speaker 122, and/or a transceiver device 124.

The camera 112 may be configured to provide visual feedback, such as one or more still images and/or video feedback, to the unmanned aerial vehicle 102 and/or an operator (e.g., user) wirelessly controlling the unmanned aerial vehicle 102. For example, the camera 112 may provide visual feedback of obstacles in the path of the unmanned aerial vehicle 102 for any purpose, such as, but not limited to, navigation guidance to the unmanned aerial vehicle 102. In a further embodiment, the camera 112 may determine a safe location for the unmanned aerial vehicle 102 to land and/or disengage the attachment device 126 to deliver the item. The camera 112 may capture one or more still images or video images and, using a database, may perform image comparison with database images, such as database 510 of FIG. 5, to determine whether or not the location is safe to land and/or release the delivery item. For example, the camera 112 may capture an image of a rooftop of a building and, using image comparison, the camera 112 may identify the rooftop as an unsafe location to release the delivery. It should be understood that various types of cameras are contemplated, including high-definition cameras, night-vision enabled cameras, infrared sensing cameras, X-ray imaging devices, line scan imaging devices, etc.

In a further embodiment, the camera 112 may be configured to take one or more still images and/or video upon delivery of an item. For example, when the unmanned aerial vehicle 102 delivers an item at a destination location, the camera 112 may capture a photo and/or video of the released delivery item at the delivery location and/or the location itself to confirm delivery and/or location of such item. The unmanned aerial vehicle 102 may provide delivery notification and/or delivery location information to the recipient by transmitting the photo and/or video to a user device 132 (e.g., a mobile device, tablet, computing device, etc.) via transceiver 124 and/or transmission medium 128. Accordingly, the recipient can confirm the time and/or actual location where the delivery item was physically delivered.

The camera 112 may be placed on the unmanned aerial vehicle 102 such that the camera may provide visual feedback in 360 degrees on a horizontal plane and/or 360 degrees on a vertical plane of the unmanned aerial vehicle 102. In some embodiments, the camera 112 may include a plurality of cameras to provide visual feedback in all directions surrounding the unmanned aerial vehicle 102 such that there are no obscurations of the visual field (e.g., blind spots). In further embodiments, the camera 112 may be embedded within the housing unit 104 so as to prevent any negative effects to aerodynamics of the unmanned aerial vehicle 102.

In an embodiment, the unmanned aerial vehicle 102 may include at least one sensor 114. The sensor 114 may include, but is not limited to, an acoustic sensor (e.g., microphone), a chemical sensor, an infrared sensor, an optical sensor, a collision avoidance sensor (e.g., a proximity sensor), a heat/temperature sensor, a gravitation force sensor (e.g., accelerometer), a speed sensor (e.g., airspeed indicator), tilt sensor, etc.

In an embodiment, the sensor 114 may be configured to detect one or more environmental variables, such as temperature, acceleration, (e.g., changes in acceleration), tilt angle, cumulative turbulence, wind resistance, exposure to sunlight, oxygen levels, pressure (e.g., atmospheric pressure), humidity, etc., associated with the unmanned aerial vehicle 102 and/or traversed during flight, which may be displayed on and/or generated by the alert system 120 to one or more individuals (e.g., an observer, recipient, etc.), as will be described in further detail. It should be understood that the term "environmental variables" should not be limited and may include other variables detected by sensor 114 and/or experienced by an unmanned aerial vehicle 102 during flight.

In an embodiment, detecting temperatures experienced and/or traversed during flight may determine, for example, assessment of risk to a perishable object during flight and/or upon delivery of such object. In a further embodiment, the sensor 114 may detect one or more environmental variables (e.g., temperature) during flight such that when an environmental variable (e.g., a temperature) exceeds a predetermined threshold, the alert system. 120 may generate an alert, such as a visual and/or audible warning indicating that the delivery item requires immediate attention. In a further embodiment, the alert system 120 may transmit an instruction and/or command to the temperature controller 116 to provide heating and/or cooling to the attachment device 126 (e.g., compartment) and/or delivery item to prevent perishing of the item. Perishable items may include, but are not limited to, food, liquids, medicines, life-forms (e.g., animals, such as mealworms and/or fish, plants), etc.

In some embodiments, the sensor 114 may be configured to detect various environmental variables traversed by the unmanned aerial vehicle 102 during flight including, but not limited to, acceleration, and/or percentage of tilt. The detected level of acceleration, and/or tilt may be displayed on the alert system 120 to, for example, assess overall flight environment and/or issue a command to the stability controller 118 to provide a more stable flight environment where acceleration, tilt and/or orientation are critical, such as during the delivery of animals or fragile items.

In some embodiments, the sensor 114 may detect measurements of at least one of acceleration and/or tilt, and the alert system 120 may transmit such measurements to the stability controller 118 to determine, for example, adjustments to maintain a balanced orientation of the delivery item(s) attached to the unmanned aerial vehicle 102 to provide a balanced load. In some embodiments, measurements of acceleration and/or tilt may be stored in a database, such as databased 510 of FIG. 510, to coordinate flight planning for future flights so as to reduce acceleration and/or tilt during flights over the same terrain.

The stability controller 118 may be configured to determine appropriate load distribution of the delivery item(s) such that the load is balanced and/or evenly displaced based on the measurements detected by the sensor 114 prior to flight. In some embodiments, the stability controller 118 may be configured to receive dimension and/or weight information of each delivery item and arrange the delivery item(s) along the unmanned aerial vehicle 102 to maintain a balanced load for an efficient flight.

In a further embodiment, the sensor 114 may be configured to detect proximity to objects and/or obstacles in the path of the unmanned aerial vehicle 102 for any purpose such as, but not limited to, navigation guidance to the unmanned aerial vehicle 102. In some embodiments, the sensor 114 may be configured to determine a distance between the unmanned aerial vehicle 102 and a detected object to avoid collision.

The unmanned aerial vehicle 102 may include an alert system 120. The alert system 120 may be a readily detectable status indicator mounted on the outside of the unmanned aerial vehicle 102 configured to generate an alert and/or status associated with the unmanned aerial vehicle 102 and/or delivery items along a delivery route. For example, the alert/status may include a progress level and/or level of task completion, such as delivery status of an item to a predetermined destination, an amount of time spent traveling, the amount of time left to reach the destination, a dollar value associated with the one or more items being transported, percentage of an order fulfillment, and/or environmental factors detected by the sensor 112 and experienced by the unmanned aerial vehicle 102 during flight.

The alert system 120 may include a light display, an illuminated color display, a digital timer display, a clock display, an acoustic signal, and/or an electronic signal. For example, the alert system 120 may include a plurality of lights positioned peripherally around the housing unit 104 of the unmanned aerial vehicle 102 configured to display various colors and/or patterns solid, flashing, multi-colored pattern of lights) to an observer and/or recipient indicating information associated with the unmanned aerial vehicle 102. The light pattern can include one or more colors which may be static (e.g., non-moving) and/or dynamic (e.g., moving, such as flashing). It should be understood that the particular light pattern for taking off, landing, and/or level of progress may be set by the industry and/or user.

In an embodiment, the alert system 120 may be configured to generate an acoustic signal, such as a beep, alarm, and/or spoken words, to indicate and/or announce information associated with the unmanned aerial vehicle 102 during flight. For example, the alert system 120 may provide various spoken announcements and/or commands (e.g., "Caution", "Landing", "Stay clear", etc.) via speaker 122 to observers. Alternatively, the alert system 120 may be configured to transmit and/or broadcast an electronic signal and/or command, via transceiver 124, to a receiving device, such as an observer's cellular telephone (e.g., user device 132). The electronic signal may indicate various information associated with the unmanned aerial vehicle 102.

In some embodiments, the alert system 120 may be observed from multiple viewpoints. For example, the alert system 120, such as a light display on the unmanned aerial vehicle 102, may be observed by a person on the ground, an air traffic controller tower, and/or various aircraft vehicles. In other embodiments, the alert system 120 may include a speaker configured to provide an audible signal indicating information associated with the unmanned aerial vehicle 102, which may be otherwise perceived by one more individuals.

The present principles provide at least one of the following advantages, namely, a readily detectable indicator mounted on the unmanned aerial vehicle 102 readily observable to individuals configured to generate a status associated with the unmanned aerial vehicle 102, such as movements of the unmanned aerial vehicle 102 and/or an assessment of risk to perishable delivery items and/or battery life of the unmanned aerial vehicle 102, especially when fragile items are being delivered. In some embodiments, observers are able to readily determine directional movement and/or flight status of the unmanned aerial vehicle 102, such as whether the unmanned aerial vehicle 102 is taking off, landing, turning, etc. Accordingly, observers can readily determine the flight status of the unmanned aerial vehicle 102 and avoid a particular area.

The alert system 120 may illuminate lights of a particular color and/or pattern. For example, the alert system 120 may illuminate lights (e.g., flashing red lights) indicating the unmanned aerial vehicle 102 is about to take-off and/or land. During flight, the alert system 120 may continuously illuminate lights along the unmanned aerial vehicle 102 as the unmanned aerial vehicle 102 approaches the delivery location indicating a status of the delivery. For example, assuming the alert system 120 includes a total of 100 lights arranged along the periphery of the unmanned aerial vehicle 102, the alert system 120 may illuminate twenty-five adjacent lights when delivery is twenty-five percent complete, fifty adjacent lights when delivery is fifty percent complete, etc. In another embodiment, the alert system 120 may illuminate one or more lights indicating how much time is left before landing and/or delivery. In a further embodiment, the alert system 120 may generate a distinct color and/or pattern when delivery has been completed and/or the unmanned aerial vehicle 102 is returning to the shipment facility and/or base station. Accordingly, an observer can readily determine that an unmanned aerial vehicle 102 flying nearby presents no hazard to the observer. It should be understood that mapping of such colors and/or patterns displayed by the alert system 120 may be set by industry standard.

The alert system 120 may provide additional details about the unmanned aerial vehicle 102 and/or delivery item(s). For example, the alert system 120 may generate a dollar value associated with the delivery item(s), which may change during the course of delivery. The alert system 120 may illuminate one or more visual displays, such as a color pattern, indicating if the delivery item(s) are of high dollar value such that the recipient can arrange to be present for delivery and/or attend to the delivery item(s) immediately upon delivery. Accordingly, the alert system 120 can generate a status indicating to the recipient the dollar value of the delivery item(s) such that the recipient can prevent thievery of the delivery items upon delivery. In some embodiments, the visual display (e.g., color pattern) indicating the dollar value of the delivery item(s) can be mapped, set or otherwise controlled by the recipient via user device 132 such that of the recipient is aware of the dollar value associated with the visual display of the alert system 120.

In some embodiments, the dollar value of the delivery item(s) may change throughout the delivery if, for example, the delivery item(s) are perishable, which may be indicated by the alert system 120. The dollar value of the delivery item may decrease when one or more environmental variables exceeds a predetermined threshold. For example, when a detected temperature is above melting point, a delivery item ice cream) may melt, and the value of the delivery item may decrease. The alert system 120 may indicate the change in dollar value of such delivery item.

In some embodiments, the alert system 120 may provide the recipient of the delivery item with an up-to-date estimated time of delivery. For example, the alert system 120, in combination with a navigation unit, such as navigation 504 of FIG. 5, may estimate time of delivery based on approximate distance to the delivery location and/or velocity (e.g., airspeed) of the unmanned aerial vehicle 102. The estimated time of delivery determined by the alert system 120 may be transmitted and/or otherwise communicated to the recipient, such as a user device 132, via the transceiver 124 and/or transmission medium 128. In addition, the user device 132 may prompt/request the alert system 120 to provide updated information associated with the unmanned aerial vehicle 102 including, but not limited to, estimated time and/or date of delivery.

In an embodiment, the alert system 120 may provide the recipient with delivery notification, such as delivery of the item and/or a percentage of order fulfillment (e.g., 50%, 1 out of 2, etc.) when multiple deliveries are expected. Accordingly, the recipient of the delivery item(s) may better estimate when delivery is expected and arrange to be present for delivery so as to prevent theft of the delivery item(s) upon delivery. In addition, the alert system 120 may indicate and/or display which part of an order is being delivered when, for example, orders are split into several packages and/or several deliveries (e.g., among multiple drones).

In some embodiments, the unmanned aerial vehicle 102 may automatically reorder delivery items if the alert system 120 indicates loss of such item. For example, if a delivery item is lost and/or damaged during flight (e.g., the attachment device 126 inadvertently releases a delivery item before delivery), the alert system 120 may identify the lost item and request replacement of such item via the transceiver 124. The transceiver 124 may communicate with a secondary transmitter/receiver device 130, such as a secondary drone 134, to obtain and deliver such item to the delivery location.

In some embodiments, the alert system 120 may indicate a total amount of time spent traveling from the shipping location and/or a battery recharging station to the delivery location. Determining the total amount of time spent traveling may be used, for example, to assess a level of risk to perishable items and/or the battery life of the power supply 110. For example, the alert system 120 may track and/or display a total amount of time spent traveling with a perishable delivery item. Upon delivery of the item, the alert system 120 may flash red lights, initiate a beeping noise and/or announcement via speaker 122, broadcast an electronic signal via transceiver 124, and/or provide a signal indicating to the recipient and/or an observer that the delivery item is perishable and/or needs immediate attention based on the total amount of time spent traveling. Accordingly, the alert system 120 may further prevent spoiling of perishable items. In addition, the alert system 120 may indicate a level of turbulence (e.g., by measuring the acceleration of the unmanned aerial vehicle 102) experienced during flight, which may further indicate a level of risk to the delivery item(s) when the delivery item is perishable.

In an embodiment, the alert system 120 may indicate a power level of the power supply 110, which may be provided to and/or sensed by a secondary transmitter/receiver device 130, such as a secondary drone 134 and/or base station 136. For example, the alert system 120 may provide a power level of the power supply 110 when the power level depletes beyond a threshold level. The alert system 120 may indicate the power level of the power supply 110 by, for example, visually displaying a color pattern along the periphery of the unmanned aerial vehicle 102, such as peripheral lights that may gradually change from green to red as the power supply 110 depletes. When the peripheral lights are all red, the alert system 120 may indicate that the power supply 110 is completely depleted of power. In other embodiments, the alert system 120 may indicate the power level of the power supply 110 by, for example, transmitting a power supply level to a secondary transmitter/receiver device 130 within a vicinity of the unmanned aerial vehicle 102.

The secondary drone 134 and/or base station 136 may be configured to provide power recharging and/or replacement power supply services to the unmanned aerial vehicle 102. For example, the secondary drone 134 may be configured to recharge the power supply 110 on the unmanned aerial vehicle 102 during flight and/or automatically replace the power supply 110 by removing, using a replacement mechanism, the depleted power supply 110 and inserting a charged power supply 110. The base station 136 may include, but is not limited to, a shipment facility and/or a battery-charging station located at various locations, including a homeowner's property. In some embodiments, the base station 136 may be fully automated to replace and/or recharge the power supply 110. In other embodiments, the base station 136 may utilize the assistance of the property owner where the base station 136 is located. For example, the property owner may initiate operation of the base station 136 to cause a replacement mechanism to remove the depleted power supply 110 and insert another power supply 110.

The alert system 120 may provide the power level of the power supply 110 to the transceiver 124, which may be transmitted, sensed, and/or received by the secondary transmitter/receiver device 130. In some embodiments, the alert system 120 may generate a request to the secondary transmitter/receiver device 130 for recharging and/or replacement battery services based on progress toward the delivery location, perishability of the delivery items, etc. The secondary transmitter/receiver device 130 may indicate availability for the unmanned aerial vehicle 102 to recharge and/or replace the power supply 110. In some embodiments, the unmanned aerial vehicle 102 may receive, from the secondary transmitter/receiver device 130, location information of the secondary transmitter/receiver device 130, such as a relay location. In further embodiments, the secondary drone 134 may travel along with the unmanned aerial vehicle 102 and provide power recharging capabilities to the unmanned aerial vehicle 102 during flight.

In some embodiments, the unmanned aerial vehicle 102 may be configured to dispense a reward to the property owner and/or base station 136 when recharging and/or replacement of the power supply 110 is complete. For example, the unmanned aerial vehicle 102 may transmit, via transceiver 124, a discount, rebate, coupon, reward points, payment, etc. for recharging and/or replacing the power supply 110. In an alternative embodiment, the unmanned aerial vehicle 102 may be configured to dispense and/or release a reward item, such as a sample item, for recharging and/or replacing the power supply 110. The reward item may be attached to the unmanned aerial vehicle via attachment device 126.

It should be understood that the alert system 120 can be programmable and/or customized based on the cognitive skills and/or abilities of the user. For example, a recipient of the delivery item(s) who is color blind may be able to program the alert system 120 with a different pattern of lights rather than a non-color blind cohort. In another embodiment, if the combination of lights and/or audible signal from the speaker affects the recipient's pets, the alert system 120 may be programmed and/or customized to better suit the recipient's environment. When the alert system 120 includes a color display, the color may be adjusted for individuals (e.g., recipients) having color blindness. In addition, sound effects generated from the alert system 120 and/or speaker 122 may be employed for the vision impaired. In addition, the mapping of color patterns may be controlled by the recipient (e.g., via user device 132) and such mappings may be stored in a database, such as database 510 of FIG. 5.

Figure 2:
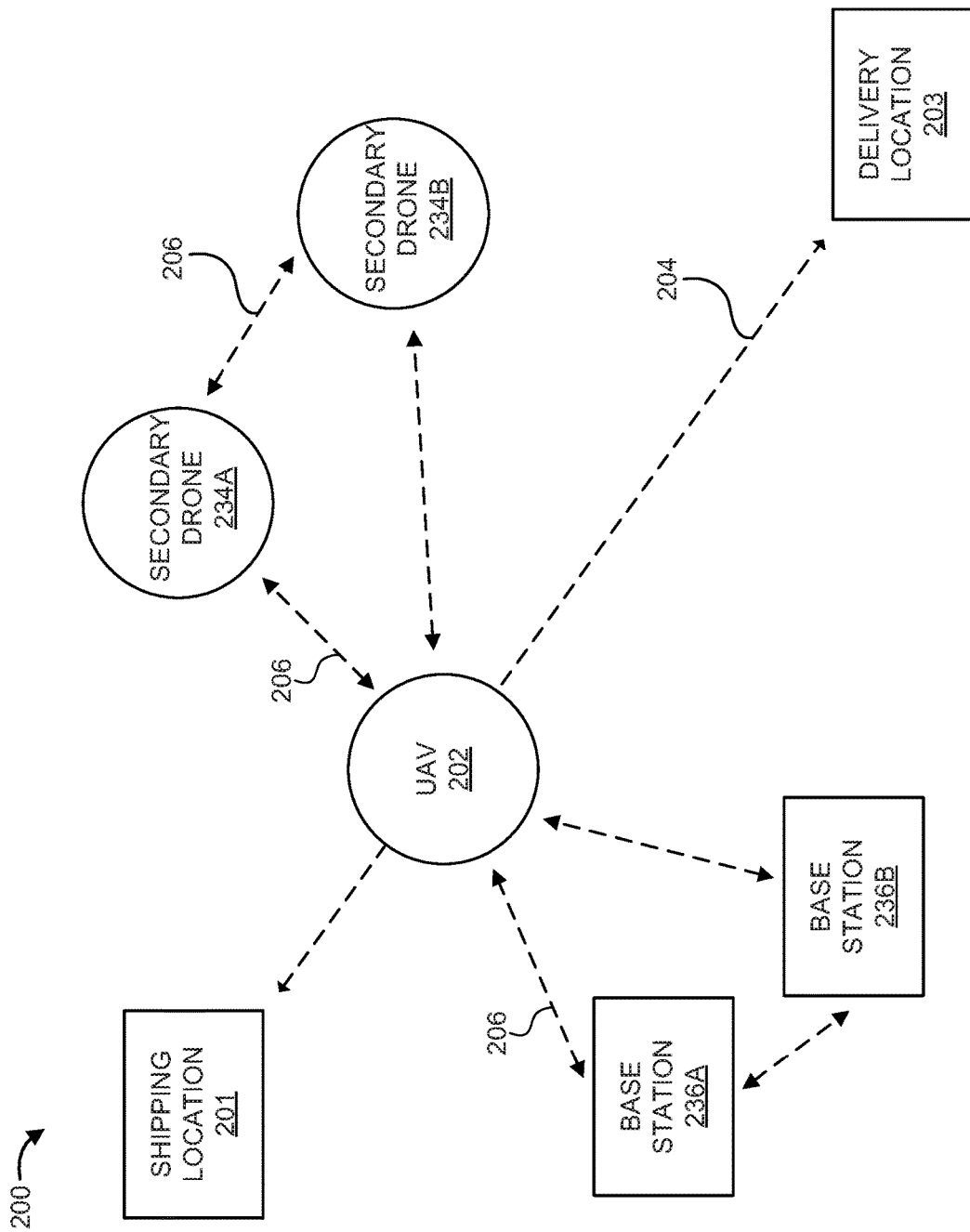
FIG. 2 shows an exemplary system/method for aerial transportation of delivery items using an unmanned aerial vehicle, in accordance with an embodiment

Now referring to FIG. 2, an exemplary system/method 200 for aerial transportation of delivery items using an unmanned aerial vehicle is illustratively depicted. The unmanned aerial vehicle (UAV) 202 may include any of system 100 of FIG. 1. As illustratively depicted in FIG. 2, the UAV 202 may be traveling to and from shipping location 201 and delivery location 203 along delivery route 204. In some embodiments, the UAV 202 may be configured to communicate 206 with one or more secondary drones 234A, 234B and/or one or more base stations 236A, 236B within the vicinity of the UAV 202. In some embodiments, the UAV 202 may transmit a power level to secondary drones 234A, 234B and/or base stations 236A, 236B and/or request availability of recharging services. In further embodiments, the requests from UAV 202 may have different weighted values depending on, for example, perishability of the items attached to the UAV 202, progress towards the delivery location 203 and/or shipping location 201, etc. For example, a request for recharging services may be higher from a UAV 202 carrying a perishable delivery item versus a UAV 202 carrying a non-perishable item.

Figure 3:
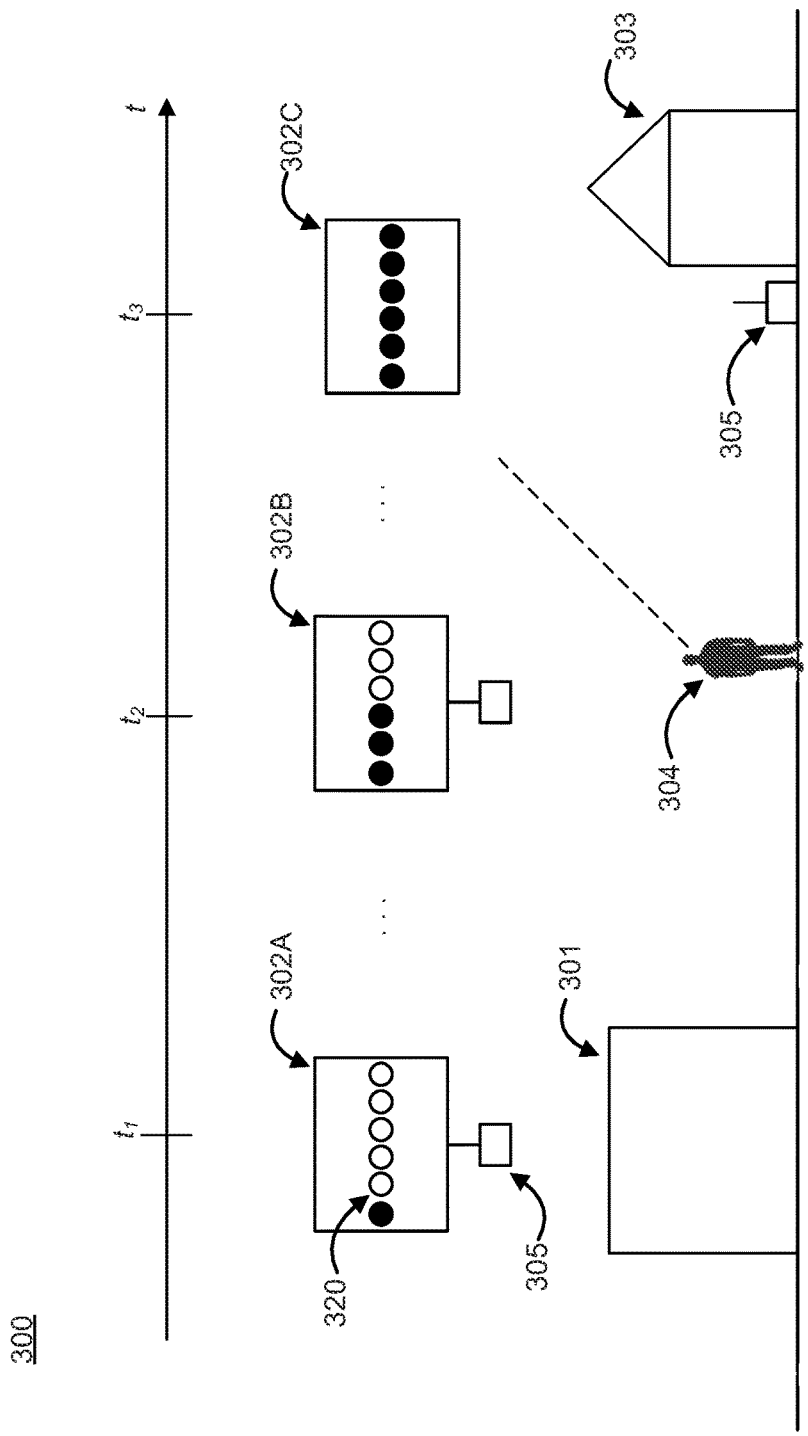
FIG. 3 shows an exemplary system/method for aerial transportation of delivery items using an unmanned aerial vehicle, in accordance with an embodiment

Now referring to FIG. 3, an exemplary system/method 300 for aerial transportation of delivery items using an unmanned aerial vehicle is illustratively depicted. The unmanned aerial vehicle 302 may include any of system 100 of FIG. 1. As shown in FIG. 3, the unmanned aerial vehicle 302 may travel between a shipping location 301 to a delivery location 303 during timeline t. As the unmanned aerial vehicle 302 progresses to the delivery location 303, the alert system 320 is configured to generate a status capable of being observed or otherwise perceived by an observer 304 indicating information associated with the unmanned aerial vehicle 302. For example, the alert system 320 may illuminate a visual display representing a progress level of the delivery. As shown in FIG. 3, the alert system 320 on the unmanned aerial vehicle 302A at $t_1$ indicates the start of the delivery of delivery item 305. At 12, the alert system 320 on the unmanned aerial vehicle 302B indicates fifty percent completion the delivery. At $t_3$, the alert system 320 on the unmanned aerial vehicle 302C indicates one-hundred percent completion of the delivery, such as when the delivery item 305 is unfastened and/or delivered at delivery location 303. Accordingly, the observer 304 is able to readily determine information associated with the unmanned aerial vehicle 302.

It is to be appreciated that system 400 described below with respect to FIG. 4, and system 500 described below with respect to FIG. 5, are systems for implementing respective embodiments of the present principles. Part or all of processing systems 100, 200 and/or 300 may be implemented in one or more of the elements of system 400 of FIG. 4 and/or system 500 of FIG. 5. Further, it is to be appreciated that processing systems 100, 200, 300, 400 and/or 500 may perform at least part of the method described herein, including, for example, at least part of method 600 of FIG. 6.

Figure 4:
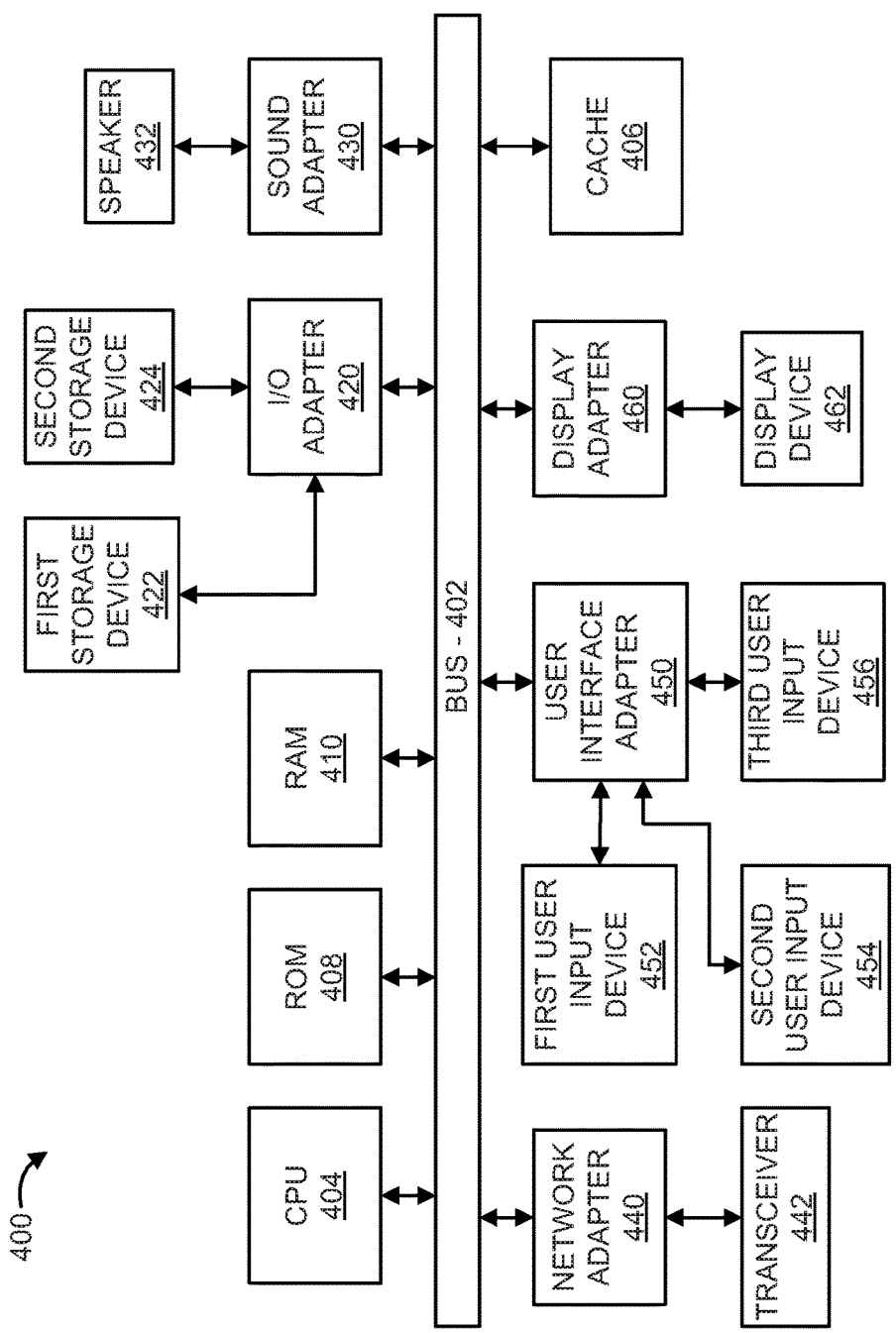
FIG. 4 shows an exemplary processing system for aerial transportation of delivery items using an unmanned aerial vehicle, in accordance with an embodiment of the present principles.

Now referring to FIG. 4, with continued reference to FIG. 1, an exemplary processing system 400 to which the present principles may be applied, in accordance with an embodiment, is illustratively depicted. The processing system 400 includes at least one processor, such as a computer processing unit (CPU) 404, operatively coupled to other components via a system bus 402. A cache 406, a Read Only Memory (ROM) 408, a Random Access Memory (RAM) 410, an input/output (110) adapter 420, a sound adapter 430, a network adapter 440, a user interface adapter 450, and a display adapter 460 are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, etc. The storage devices 422 and 424 can be the same type of storage device or different types of storage devices. In one embodiment, database images may be stored on the first storage device 422 and/or the second storage device 424 for comparison with images obtained by the camera 112 of FIG. 1.

A speaker 432 is operatively coupled to system bus 402 by the sound adapter 430. In one embodiment, the unmanned aerial vehicle 102 may be configured to indicate a level of progress and/or status by providing an audio signal, such as a beep, alarm, audible command, etc., from the speaker 432.

A transceiver 442 is operatively coupled to system bus 402 by network adapter 440. A display device 462 is operatively coupled to system bus 402 by display adapter 460. In some embodiments, the display device 462 may be configured to receive still images and/or video feedback from camera 112 of FIG. 1. The display device 462 may be used to, for example, provide visual guidance to an operator of the unmanned aerial vehicle 102 for purposes such as navigation guidance.

A first user input device 452, a second user input device 454, and a third user input device 456 are operatively coupled to system bus 402 by user interface adapter 450. The user input devices 452, 454, and 456 can be any type of input device, including but not limited to, a keyboard, a mouse, a keypad, an image capture device, a motion sensing device, a microphone, a device incorporating the functionality of at least two of the preceding devices, and so forth. Other types of input devices can also be used while maintaining the spirit of the present principles. The user input devices 452, 454, and 456 can be the same type of user input device or different types of user input devices. The user input devices 452, 454, and 456 are used to input and output information to and from system 400.

The processing system 400 may also include other elements (not shown) or may omit some elements as shown. For example, various other input devices and/or output devices can be included in processing system 400 depending upon the particular implementation of the same, such as various types of wireless and/or wired input and/or output devices. Moreover, additional processors, controllers, memories and so forth, in various configurations, can also be utilized. These and other variations of the processing system 400 are readily contemplated.

Referring now to FIG. 5, with continued reference to FIG. 1, an exemplary system 500 for aerial transportation of delivery items using an unmanned aerial vehicle 102 is shown, in accordance with an embodiment of the present principles. The system 500 includes a flight controller 502, a navigation unit 504, a monitoring device 506, an alert system 508, a database 510, an authentication unit 512, a locking device 514, a risk analysis device 516 and/or a value adjustment device 518.

The flight controller 502 may be configured to control movement of the unmanned aerial vehicle 102. In one embodiment, the flight controller 502 may include a motor, such as motor 108 in FIG. 1. In some embodiments, the flight controller 502 may control the aerial movement of the unmanned aerial vehicle 102 by controlling the at least one movement mechanism 106 and/or motor 108 illustrated in FIG. 1. For example, the flight controller 502 may control aerial movement of the unmanned aerial vehicle 102 by sending control signals to the at least one movement mechanism 106 and/or motor 108 to maintain a level flight.

In an embodiment, the flight controller 502 may be configured to control movement of the unmanned aerial vehicle 102 by controlling the rotational speed(s) and/or rotational direction(s) of each of the movement mechanisms 106 independently and/or collectively. For example, the flight controller 502 may be configured to rotate each of the movement mechanisms 106 in a single direction, or alternatively, the flight controller 502 may be configured to rotate each of the movement mechanisms 106 in opposing directions. In one embodiment, the flight controller 502 may be configured to control movement of the unmanned aerial vehicle 102 to avoid collision between the unmanned aerial vehicle 102 and various obstacles (e.g., trees, mountains, etc.).

In a further embodiment, the system 500 may include a navigation unit 504, such as a global positioning system (UPS). The navigation unit 504 may provide location information for particular shipping locations, delivery locations, and/or locations of one or more secondary devices 130, such as a user device 132, a secondary drone 134 and/or base station 136. Accordingly, the navigation unit 504 may provide the unmanned aerial vehicle 102 with navigation coordinates of various locations, including relay locations where the secondary drone 134 and/or base station 136 can meet for power supply recharging and/or replacement. The navigation unit 504 may include map coordinates of a particular area and may provide such information to the flight controller 502, such that the flight controller 502 may direct the unmanned aerial vehicle 102 to a particular location.

In an embodiment, the system 500 may include a monitoring device 506. The monitoring device 506 may include a camera, a sensor, a radar system, or similarly functioning devices. In some embodiments, the monitoring device 506 may be configured to perform one or more operations as described above in relation to the camera 110, sensor 114, temperature controller 116, and/or stability controller 118 of FIG. 1. For example, the monitoring device 506 may capture one or more still images or video images and, using database 510, may perform image comparison with database images to determine whether or not the location is safe to land and/or release a delivery item. In another embodiment, the monitoring device 506 may determine appropriate weight distribution of the delivery items along the unmanned aerial vehicle 102.

The system may include an alert system 508. The alert system 508 may perform the operations as described above with reference to the alert system 120. In some embodiments, the alert system 508 may include a readily detectable indicator configured to generate a status and/or an alert associated with the unmanned aerial vehicle 102, such as level of task completion, an amount of time spent traveling, a dollar value associated with the delivery items, percentage of air order fulfillment, and/or a level of environmental variables traversed, such as a level of turbulence or acceleration experienced by the unmanned aerial vehicle 102 during flight. The alert system 508 may include a light display, an illuminated color display, a digital timer display, a clock display, and/or an electronic signal.

In an embodiment, the system 500 may include a database 510. The database 510 may be configured to store one or more still images or video images of buildings and/or landing areas, such as flat terrain, mailboxes, porches, etc. In some embodiments, the database 510 may provide such database images and/or video for image comparison with images and/or videos captured by the monitoring device 506. In a further embodiment, visual patterns and/or audible signals for the alert system 508 may be stored in database 510.

The authentication unit 512 may be configured to verify recipient information and/or delivery location for delivery of the item transported by the unmanned aerial vehicle 102. In some embodiments, the authentication unit 512 may include a scanner, such as a biometric scanner (e.g., thumbprint reader, retinal scanner, etc.) and/or Radio-frequency identification (RFID) scanner, to verify a recipient in order to release the delivery item. In other embodiments, the authentication unit 512 may include a scanner configured to scan a barcode, such as a quick response code, provided by the recipient. For example, the recipient may provide a barcode on a user device, such as a cellular telephone and/or tablet, which the authentication unit 512 may scan to verify identification of the recipient. In further embodiments, the authentication unit 512 may include a user interface configured to receive a password input by the recipient. The authentication unit 512 may compare the input password with a stored password, such as a password stored in database 510, to verify the recipient. If the authentication unit 512 fails to correctly verify the recipient information, the authentication unit 512 may transmit a command to the flight controller 502 and/or navigation unit 504 to return to the shipment location. In some embodiments, the alert system 120 may indicate whether or not authentication has failed by, for example, visually displaying and/or announcing (e.g., via speaker 122) that authentication has failed.

In some embodiments, the system 500 may include a locking device 514. The locking device 514 may include, for example, electronic deadbolts and/or latches, a digital lock, an electronic lock, an electromagnetic lock, and/or similar functioning devices. The locking device 514 may be configured to "lock" the unmanned aerial vehicle 102. For example, the locking device 514 may lock the delivery item to the attachment device 126 until authentication of the recipient is verified by the authentication unit 512. Accordingly, the unmanned aerial vehicle 102 may be in a "locked mode" until the appropriate recipient supplies the appropriate unlock input (e.g., password, verification, validation, etc.) so as to prevent thievery of such delivery items and/or delivery to incorrect recipients. In some embodiments, the alert system 508 may indicate that the unmanned aerial vehicle 102 is in a locked mode by, for example, illuminating one or more visual displays, generating an audible alarm, and/or providing an electronic signal indicating that the unmanned aerial vehicle 102 is locked.

The risk analysis device 516 may be configured to evaluate a level of risk associated with one or more of the delivery items. In some embodiments, the risk analysis device 516 may determine a level of risk to delivery items that include perishable items. The risk analysis device 516 may determine whether or not a delivery item requires immediate attention upon delivery based on, for example, one or more environmental variables (e.g., an amount of travel time, temperatures traversed, and/or turbulence) experienced by the unmanned aerial vehicle 102 during delivery. The risk analysis device 516 may be configured to provide the level of risk associated with the delivery item to the alert system 508 to, for example, indicate that the delivery item requires attention.

The system 500 may include a value adjustment device 518. The value adjustment device 518 may be configured to adjust the value of the delivery items depending on the risk level determined by, for example, the risk analysis device 516. For example, if the risk level to a perishable delivery item is high, the dollar value of the delivery item may be adjusted such that the value increases and/or decreases. As an example, if the delivery item is ice cream and the temperature sensor 114 determines that, during the delivery, the traversed temperature exceeds a threshold value, then a dollar value and/or price charged for the ice cream may be reduced since the ice cream may be partially melted. Alternatively, the value adjustment device may increase the dollar value associated with the delivery item if a delivery is made early and/or arrives hot, such as a pizza being delivered to a home.

In the embodiment shown in FIG. 5, the elements thereof may be interconnected by a bus 501. However, in other embodiments, other types of connections can also be used. Moreover, in an embodiment, at least one of the elements of system 500 is processor-based. Further, while one or more elements may be shown as separate elements, in other embodiments these elements can be combined as one element. These and other variations of the elements of system 500 are readily determined by one of ordinary skill in the art, given the teachings of the present principles provided herein.

Figure 6:
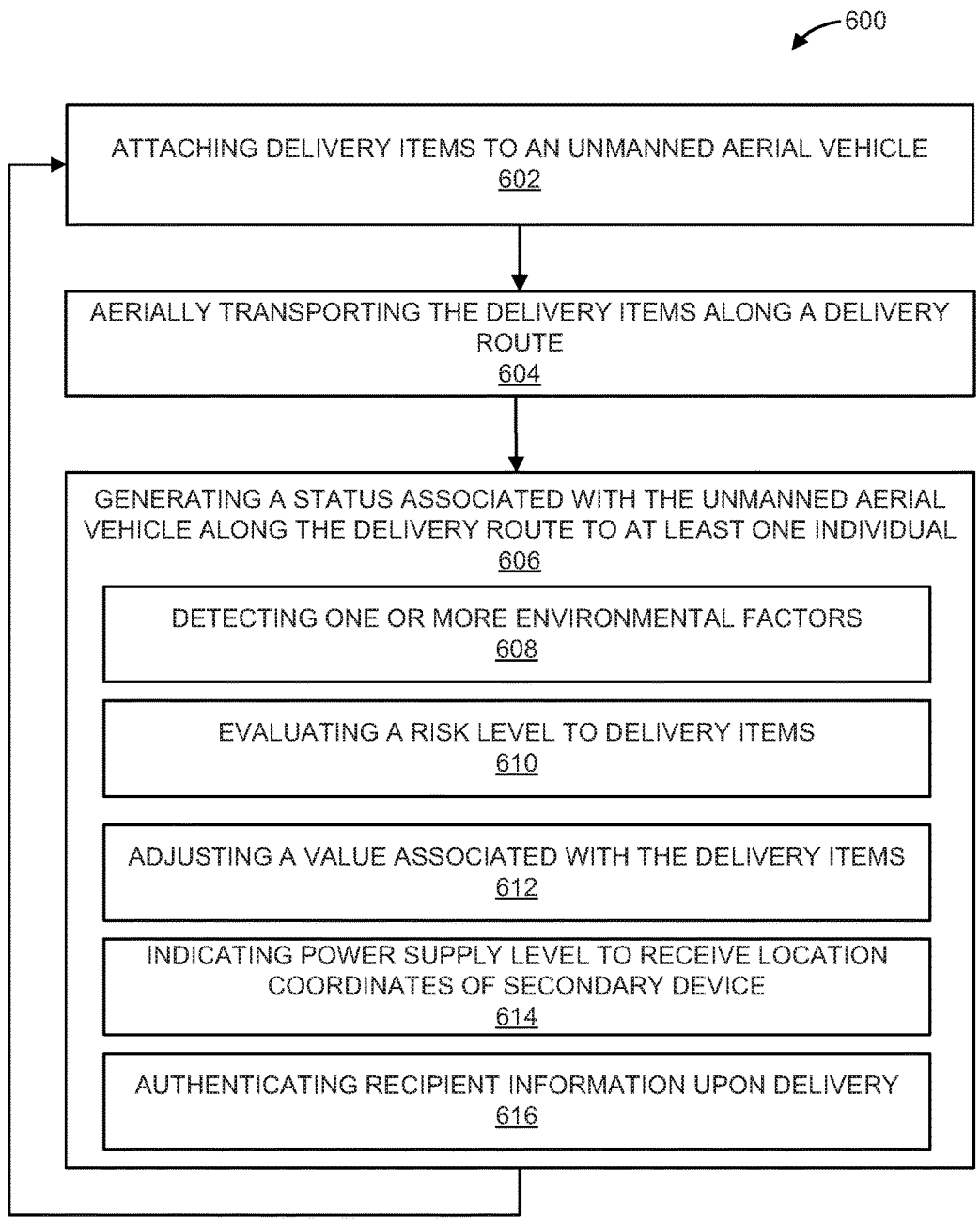
FIG. 6 shows an exemplary method for aerial transportation of delivery items using an unmanned aerial vehicle, in accordance with an embodiment of the present principles.

Now referring to FIG. 6, with continued reference to FIGS. 1-5, FIG. 6 shows an exemplary method. 600 for aerial transportation of delivery items using an unmanned aerial vehicle 102.

In block 602, the method 600 may include fastening one or more delivery items to an unmanned aerial vehicle 102 using an attachment device, such as attachment device 126 of FIG. 1. In an embodiment, the de items may be attached by determining appropriate placement of the delivery items to maintain a balanced load. The method 600 may include aerially transporting the delivery items along a delivery route, as illustrated in block 604.

In block 606, the method 600 may' further include generating a status associated with the unmanned aerial vehicle 102. The status may include a progress level and/or level of task completion, such as delivery status of an item to a predetermined destination, an amount of time spent traveling, a dollar value associated with the one or more items being transported, percentage of an order fulfillment, directional movement and/or environmental factors detected during flight. The status may be provided by one or more visual displays, acoustic signals, or electronic signals, such as a light display, a speaker and/or transceiver. The status is capable of being observed from multiple viewpoints and/or otherwise perceived by one or more individuals.

In some embodiments, generating a status associated with the unmanned aerial vehicle 102 may include detecting one or more environmental factors, such as temperatures, turbulence, tilt and/or acceleration traversed along the delivery route, and displaying the one or more environmental factors as the status, as illustrated in block 608. In a further embodiment, generating a status may include evaluating a risk level to the one or more delivery items and displaying the risk level as the status, as shown in block 610. For example, the risk level may be evaluated when the traversed temperatures, the amount of traversed turbulence, or the tilt orientation exceeds a predetermined threshold.

In some embodiments, the status may be a value associated with the one or more delivery items. In block 612, generating the status may include adjusting the value associated with the delivery items based on the risk level and/or indicating that the one or more delivery items requires immediate attention based on the evaluated risk level.

In block, 614, generating the status may further include indicating the power supply level of the unmanned aerial vehicle 102 when the power supply level depletes beyond a predetermined threshold, and receiving location coordinates of a secondary device configured to provide power supply recharging and/or replacement. The secondary device may include a user device, a secondary drone, or base station.

In block 616, generating the status may further include authenticating recipient information upon delivery. When the recipient information is authenticated, the delivery items may be released. In some embodiments, the status may indicate whether or not the recipient information is authenticated or not. When recipient information fails to be authenticated, the status may indicate that authentication has failed and/or the delivery item may remain fastened to the unmanned aerial vehicle.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
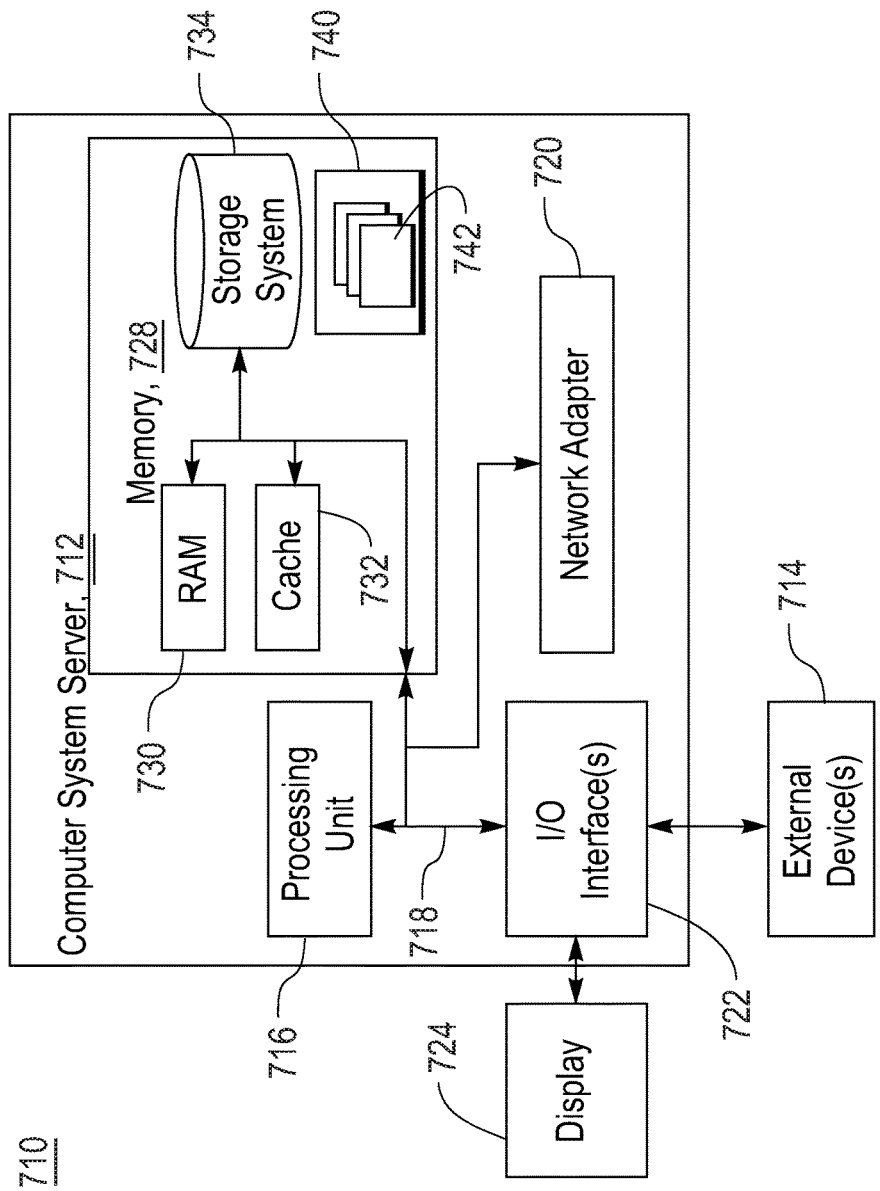
FIG. 7 shows an exemplary cloud computing node, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 628 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
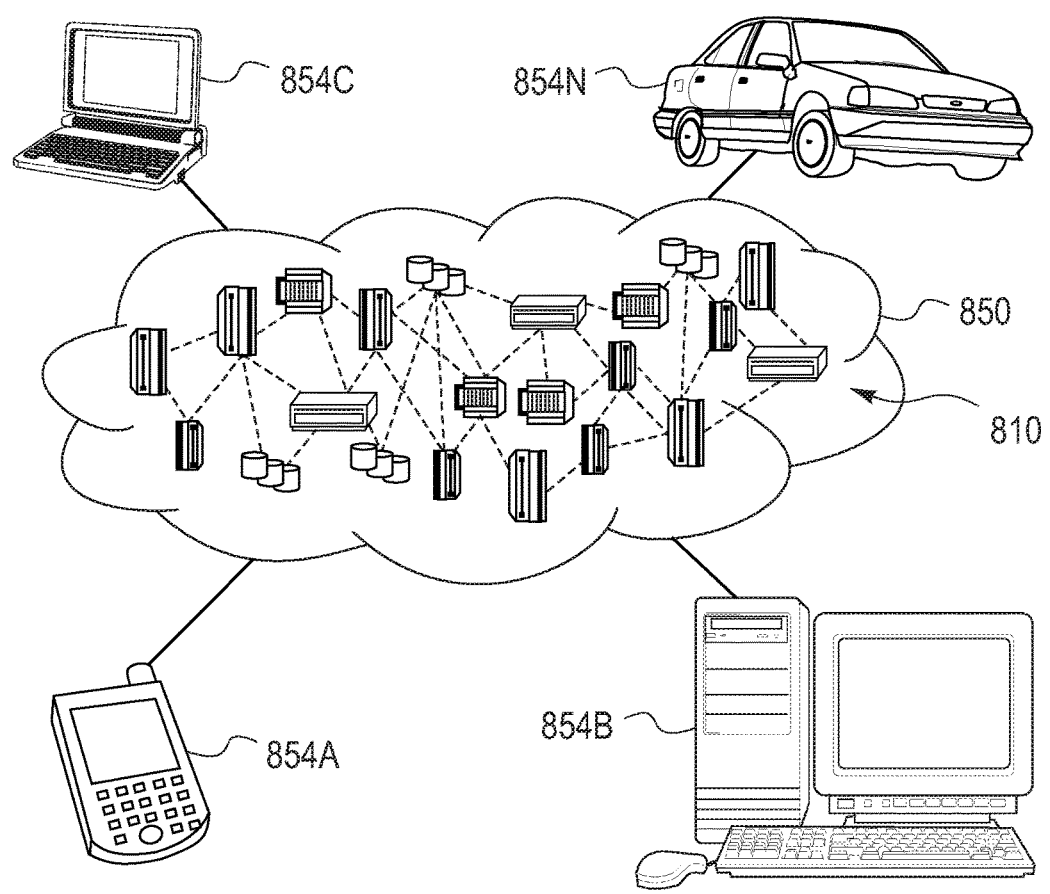
FIG. 8 shows an exemplary cloud computing environment, in accordance with an embodiment of the present principles.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854O, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
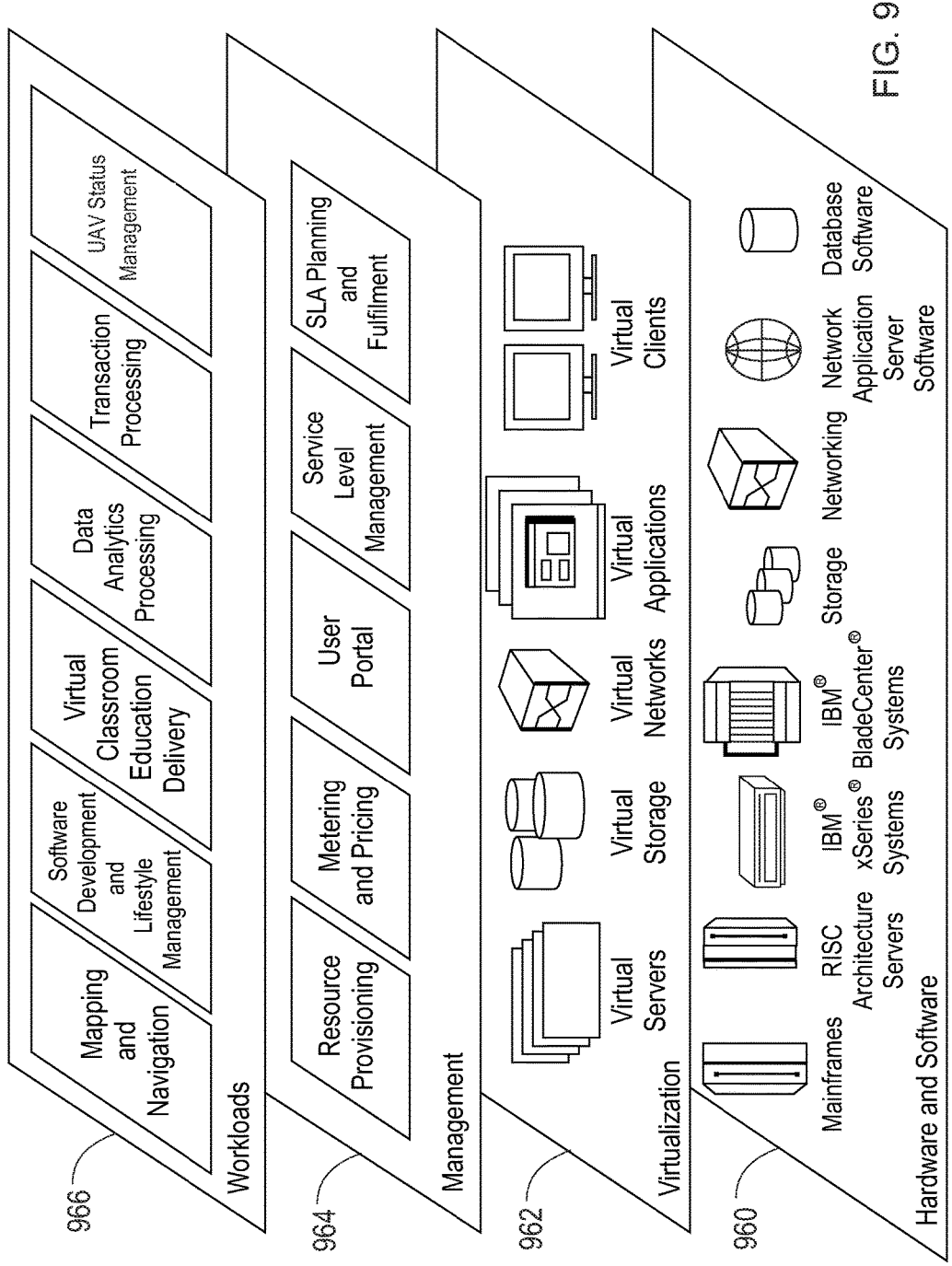
FIG. 9 shows exemplary abstraction model layers, in accordance with an embodiment of the present principles.

Referring now to FIG. 9, a set of functional abstraction layers provided by cloud computing environment 850 (Ha 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from his layer include: mapping and navigation; software development and lifecycle management; virtual classroom education delivery; data analytics processing; transaction processing; and unmanned aerial vehicle (UAV) status management.

Having described preferred embodiments of an unmanned aerial vehicle for aerial transportation of delivery items using an unmanned aerial vehicle, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An unmanned aerial vehicle for aerial transportation of delivery items, the unmanned aerial vehicle comprising:
   at least one attachment device to fasten and unfasten one or more delivery items to the unmanned aerial vehicle;
   at least one motor to aerially transport the one or more delivery items along a delivery route;
   at least one sensor mounted on the unmanned aerial vehicle to detect at least one environmental variable during the delivery route; and
   an alert system, including a risk analysis device, configured to generate a status associated with the unmanned aerial vehicle along the delivery route to at least one observer when the at least one environmental variable exceeds a predetermined threshold, wherein the status includes a risk level to the one or more delivery items.

2. The unmanned aerial vehicle of claim 1, wherein the status is selected from the group consisting of one or more visual displays, acoustic signals, and electronic signals.

3. The unmanned aerial vehicle of claim 1, wherein the alert system is selected from the group consisting of a display device, a light display, an illuminated color display, a digital timer, a clock, a speaker device, and a transceiver.

4. The unmanned aerial vehicle of claim 1, wherein the status is further selected from the group consisting of temperatures traversed, a level of turbulence traversed, a percentage of delivery completion, a total amount of travel time, an estimated delivery time, a value of the one or more delivery items, a power supply level of the unmanned aerial vehicle, directional movement of the unmanned aerial vehicle, and a tilt orientation of the unmanned aerial vehicle.

5. The unmanned aerial vehicle of claim 1, wherein the alert system is further configured to:
   indicate a power supply level of the unmanned aerial vehicle when the power supply level depletes below a threshold; and
   receive location coordinates of a secondary device where the power supply level is to be replaced or recharged, wherein the secondary device includes a user device, a secondary drone, or base station configured to provide power supply recharging or power supply replacement.

6. The unmanned aerial vehicle of claim 3, wherein the at least one environmental variable is selected from the group consisting of one or more traversed temperatures, amount of traversed turbulence, and tilt orientation of the unmanned aerial vehicle along the delivery route.

7. The unmanned aerial vehicle of claim 1, wherein the risk analysis device evaluates the risk level to the one or more delivery items when the at least one environmental variable exceeds the predetermined threshold, wherein the status includes an indication that the one or more delivery items requires immediate attention based on the risk level.

8. The unmanned aerial vehicle of claim 7, further comprising a value adjustment device configured to adjust a value of the one or more delivery items depending on the risk level to the one or more delivery items.

9. The unmanned aerial vehicle of claim 1, further comprising an authentication unit to authenticate recipient information upon delivery of the one or more delivery items, wherein the one or more delivery items remains fastened to the unmanned aerial vehicle until authentication is confirmed.

10. A method for aerial transportation of delivery items using an unmanned aerial vehicle, the method comprising:
    attaching one or more delivery items to the unmanned aerial vehicle;
    aerially transporting the one or more delivery items along a delivery route;
    detecting, using at least one sensor mounted on the unmanned aerial vehicle, at least one environmental variable during the delivery route; and
    generating, by evaluating the risk level to the one or more delivery items, a status associated with the unmanned aerial vehicle along the delivery route to at least one observer when the at least one environmental variable exceeds a predetermined threshold, wherein the status includes a risk level to the one or more delivery items.

11. The method of claim 10, wherein the status is further selected from the group consisting of temperatures traversed, a level of turbulence traversed, a percentage of delivery completion, a total amount of travel time, an estimated delivery time, a value of the one or more delivery items, a power supply level of the unmanned aerial vehicle, directional movement of the unmanned aerial vehicle, and a tilt orientation of the unmanned aerial vehicle.

12. The method of claim 10, wherein generating the status associated with the unmanned aerial vehicle further includes:
    indicating a power supply level of the unmanned aerial vehicle when the power supply level depletes below a threshold; and
    receiving location coordinates of a secondary device where the power supply level is to be replaced or recharged, wherein the secondary device includes a user device, a secondary drone, or base station configured to provide power supply recharging or power supply replacement.

13. The method of claim 10, wherein the at least one environmental variable is selected from the group consisting of one or more traversed temperatures, amount of traversed turbulence, and tilt orientation of the unmanned aerial vehicle along the delivery route.

14. The method of claim 10, wherein generating the status associated with the unmanned aerial vehicle includes indicating that the one or more delivery items requires immediate attention based on the risk level.

15. The method of claim 14, wherein generating the status associated with the unmanned aerial vehicle includes adjusting a value of the one or more delivery items depending on the risk level to the one or more delivery items.

16. The method of claim 10, wherein generating the status associated with the unmanned aerial vehicle includes authenticating recipient information upon delivery of the one or more delivery items, wherein the one or more delivery items remains fastened to the unmanned aerial vehicle until authentication is confirmed.

17. A non-transitory computer readable storage medium comprising a computer readable program for aerial transportation of delivery items using an unmanned aerial vehicle, wherein the computer readable program, when executed on a computer, causes the computer to execute:
    attaching one or more delivery items to the unmanned aerial vehicle;

aerially transporting the one or more delivery items along a delivery route;
detecting, using at least one sensor mounted on the unmanned aerial vehicle, at least one environmental variable during the delivery route; and
generating, by evaluating the risk level to the one or more delivery items, a status associated with the unmanned aerial vehicle along the delivery route to at least one observer when the at least one environmental variable exceeds a predetermined threshold, wherein the status includes a risk level to the one or more delivery items.

18. The non-transitory computer readable storage medium of claim 17, wherein the status is further selected from the group consisting of temperatures traversed, a level of turbulence traversed, a percentage of delivery completion, a total amount of travel time, an estimated delivery time, a value of the one or more delivery items, a power supply level of the unmanned aerial vehicle, directional movement of the unmanned aerial vehicle, a tilt orientation of the unmanned aerial vehicle, or combination thereof.

19. The non-transitory computer readable storage medium of claim 17, wherein generating the status associated with the unmanned aerial vehicle includes
indicating that the one or more delivery items requires immediate attention based on the risk level.

20. The non-transitory computer readable storage medium of claim 19, wherein generating the status associated with the unmanned aerial vehicle includes adjusting the value of the one or more delivery items depending on the risk level to the one or more delivery items.

* * * * *